United States Patent
Jin et al.

(10) Patent No.: US 8,155,205 B2
(45) Date of Patent: Apr. 10, 2012

(54) DYNAMIC DECODER SWITCH

(75) Inventors: Chao Jin, Hangzhou (CN); Lingxiao Ma, Hangzhou (CN); Xiaofeng Jiang, Hangzhou (CN); Yaguang Xie, Hangzhou (CN)

(73) Assignee: ArcSoft, Inc., Fremont, CA (US)

( * ) Notice: Subject to any disclaimer, the term of this patent is extended or adjusted under 35 U.S.C. 154(b) by 1427 days.

(21) Appl. No.: 11/680,231

(22) Filed: Feb. 28, 2007

(65) Prior Publication Data

US 2008/0204445 A1    Aug. 28, 2008

(51) Int. Cl.
*H04B 1/66* (2006.01)
*H04N 7/12* (2006.01)
*H04N 11/02* (2006.01)
*H04N 11/04* (2006.01)

(52) U.S. Cl. ......... 375/240.25; 375/240.26; 375/240.29

(58) Field of Classification Search .................. 375/240, 375/240.25, 240.26, 240.29
See application file for complete search history.

(56) References Cited

U.S. PATENT DOCUMENTS

| | | | | |
|---|---|---|---|---|
| 7,899,864 | B2 * | 3/2011 | Margulis | 709/204 |
| 2004/0122963 | A1 * | 6/2004 | Krejsa | 709/230 |
| 2004/0221054 | A1 * | 11/2004 | Bhattacharya et al. | 709/231 |

* cited by examiner

*Primary Examiner* — Eleni Shiferaw
*Assistant Examiner* — Jing Sims
(74) *Attorney, Agent, or Firm* — Patent Law Group LLP; David C. Hsia

(57) ABSTRACT

A method provides for dynamic changes in a software video player. The method includes learning of a dynamic change from an input pin of a decoder filter, recording states of the decoder filter and a renderer filter, stopping the decoder and the renderer filters without changing a state of a source filter, and setting parameters for an output pin of the decoder filter. The parameters include setting a decoding mode. If the decoder filter output pin and a renderer filter input pin remain connected, a ReconnectEX function is used to set a new media type at the decoder filter output pin. Otherwise the method calls a Connect function to connect the pins and set the new media type. The method further includes changing to a decoder core in the decoder filter appropriate for the dynamic change and restoring the decoder and the renderer filters back to their original states.

16 Claims, 3 Drawing Sheets

DYNAMIC DECODER SWITCH

FIELD OF INVENTION

This invention relates to a Blue-ray Disk (BD) and High Density (HD) Digital Video Disk (DVD) software video players, digital television, and other applications that play video streams in Microsoft Window.

DESCRIPTION OF RELATED ART

BD and HD DVD standards require a video player to support three video standards: ISO MPEG-2, H.264/AVC, and SMPTE VC-1. A software video player can be implemented with Microsoft DirectShow, which is a media-streaming architecture for the Microsoft Windows. While DirectShow provides some solutions for dynamic graph building, these solutions do not adequately address certain scenarios without stopping the entire filter graph. Thus, what is needed is a software video player based on DirectShow with an improved dynamic graph building.

BRIEF DESCRIPTION OF THE DRAWINGS

Use of the same reference numbers in different figures indicates similar or identical elements.

SUMMARY

In one embodiment of the invention, a method provides for dynamic changes in a software video player. The method includes learning of a dynamic change from an input pin of a decoder filter, recording states of the decoder filter and a renderer filter, stopping the decoder and the renderer filters without changing a state of a source filter, and setting parameters for an output pin of the decoder filter. The parameters include setting a decoding mode. If the decoder filter output pin and a renderer filter input pin remain connected, a ReconnectEX function is used to set a new media type at the decoder filter output pin. Otherwise the method calls a Connect function to connect the pins and set the new media type. The method further includes changing to a decoder core in the decoder filter appropriate for the dynamic change and restoring the decoder and the renderer filters back to their original states.

DETAILED DESCRIPTION

Figure 1:
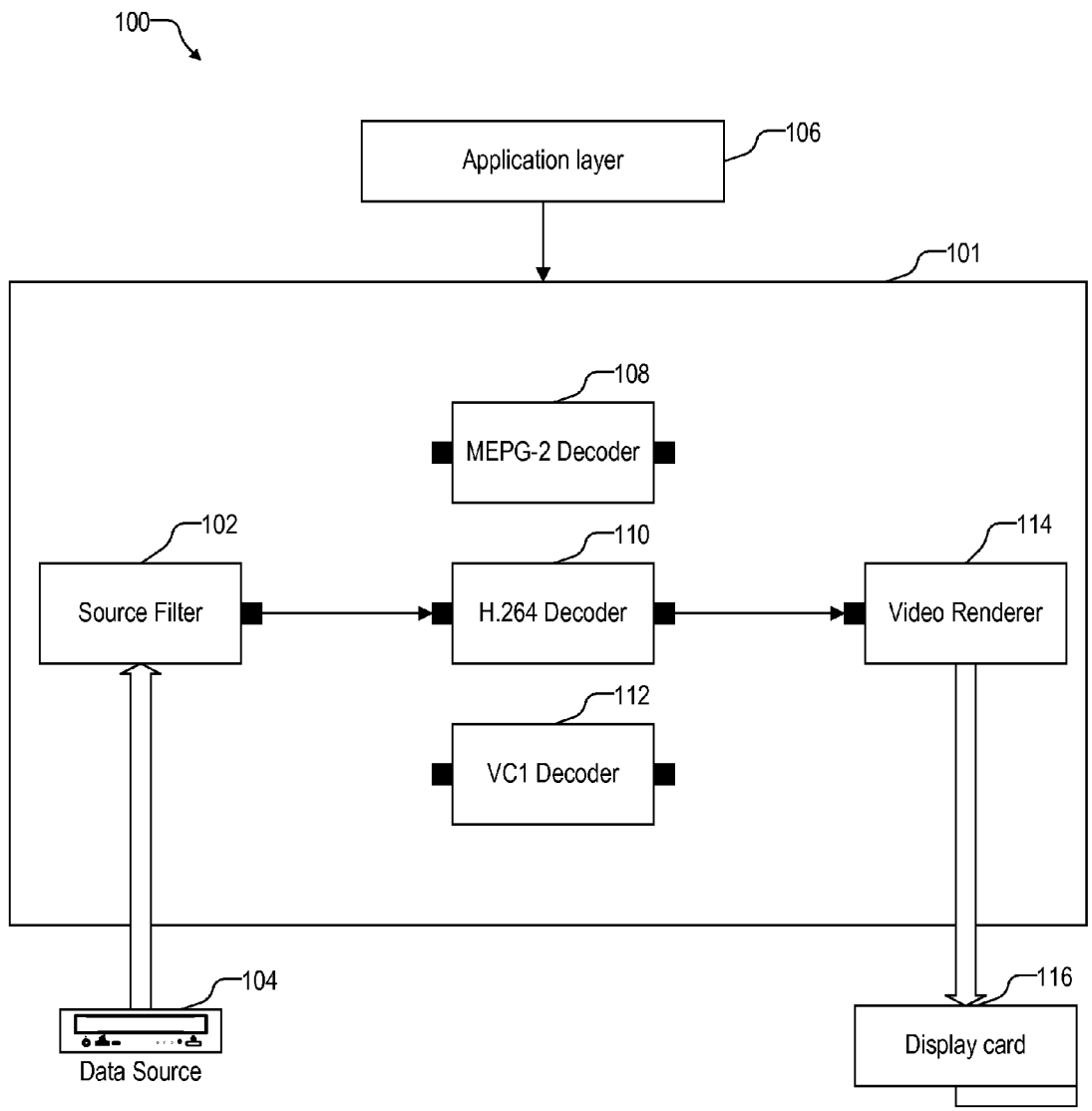
FIG. 1 illustrates a conventional video player implemented with Microsoft DirectShow.

FIG. 1 illustrates a software video player 100 implemented using Microsoft DirectShow. Video player 100 is typically executed by a processor in a computer or in an appliance. Video player 100 has a source filter 102 that reads the data of a file from a data source 104. Data source 104 may be any data source, such as a hard disk, a network, or a camera. Depending on the data type, an application layer 106 connects the output pin of source filter 102 to the input pin of one of a MPEG2 decoder filter 108, a H.264 decoder filter 110, and a VC1 decoder filter 112. Application layer 106 also connects the output pin of the selected decoder filter to the input pin of a video renderer filter 114 to complete a filter graph. Each of decoder filters 108, 110, and 112 is able to take the input data, decompress the data to video frames, and outputs the video frames to video renderer filter 114. Video renderer filter 114 then draws the video frames on a display card 116 for display on a screen.

There are certain disadvantages with the setup of FIG. 1. To dynamically change from a current decoder filter to a new decoder filter when the video format changes, application layer 106 has to break the connections between the filters and establish new connections between the filters. The dynamic change between the decoder filters also increases the complexity of application layer 106. While one could modify source filter 102 to accommodate the dynamic change between the decoder filters, it is a costly undertaking since source filter 102 for BD and HD software video players are complicated software. The solutions provided by DirectShow also do not support dynamic change between a software decoding mode and a hardware decoding mode (i.e., DirectX Video Acceleration) that allows the video player 100 to offload some graphics operations from a general purpose processor to a graphics card. Furthermore, the solutions provided by DirectShow will fail when a display card does not support DirectX Video Acceleration (DXVA).

Therefore, there are three main types of dynamic changes that should be supported by a software video player.

1) Dynamic change of display size and aspect ratio when the video format and the decoding mode (e.g., software or hardware) do not change.
2) Dynamic change between software decoding and hardware decoding modes when the video format does not change.
3) Dynamic change of the video format, e.g., from MEPG-2 to VC1.

The first type of dynamic change is supported by functions provided in the DirectShow software development kit (SDK). For example, the QueryAccept and the ReceiveConnection functions may be used to support the first type of dynamic changes. However, experiments show that these functions do not support the second type of dynamic change very well. Thus, a software video player that supports the second type of dynamic change has been developed and its use expanded to the third type of dynamic change.

Figure 2:
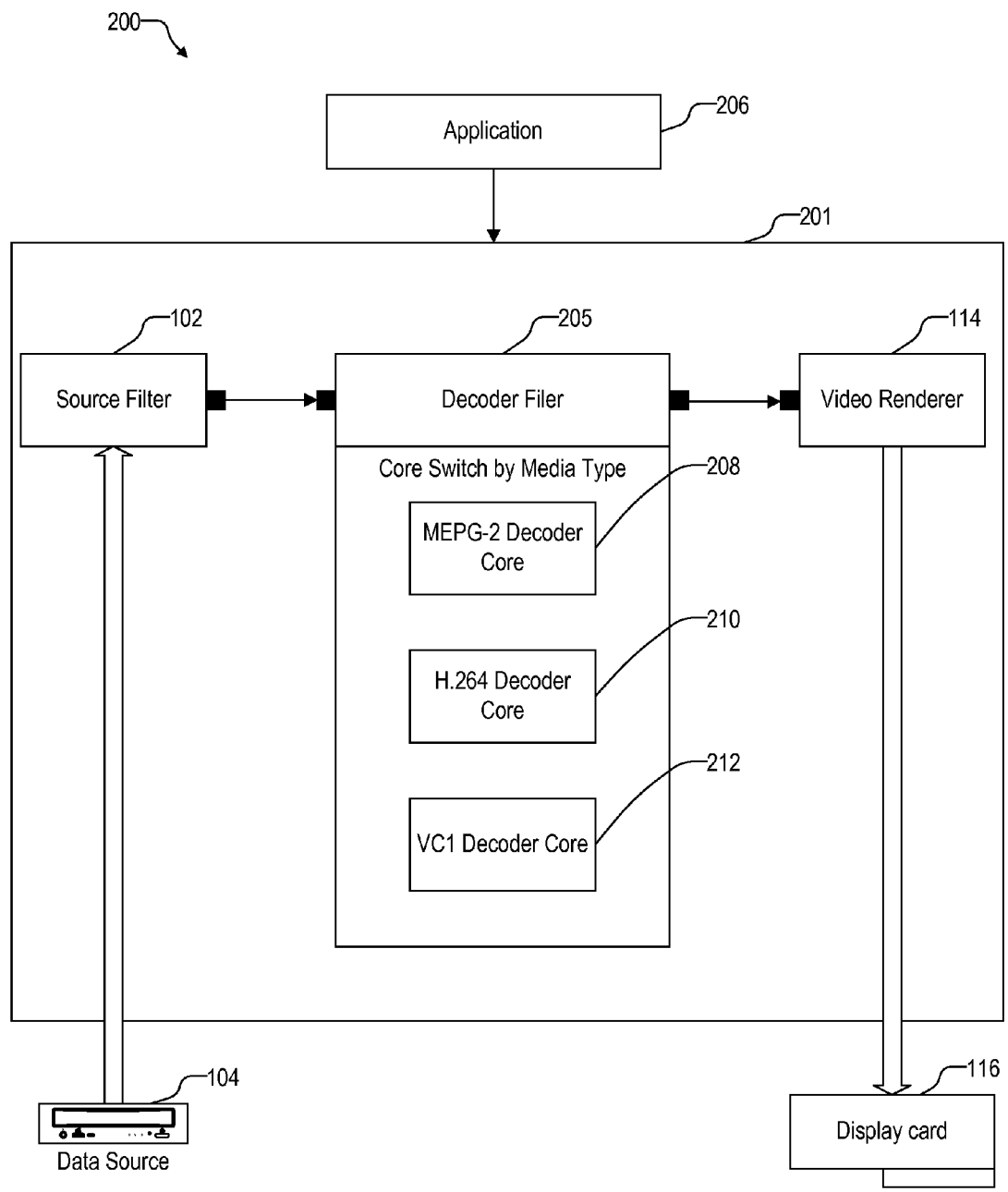
FIG. 2 illustrates a video player implemented with Microsoft DirectShow in one embodiment of the invention.

FIG. 2 illustrates a software video player 200 implemented using Microsoft DirectShow in one embodiment of the invention. Video player 200 is typically executed by a processor in a computer or in an appliance. Video player 200 has source filter 102 that reads the data of a file from data source 104. An application layer 206 connects the output pin of source filter 102 to the input pin of a decoder filter 205.

Decoder filter 205 includes a MPEG2 decoder core 208, a H.264 decoder core 210, and a VC1 decoder core 212. Each decoder core may be implemented as a Windows dynamic linked library (DLL) module. Each decoder core is able to take the input data, decompress the data to video frames, and output the video frames. Application layer 206 connects the output pin of decoder filter 205 to the input pin of video renderer filter 114 to complete a filter graph. Video renderer filter 114 then draws the video frames on display card 116 for display on a screen.

As FIG. 2 shows, software video player 200 only has one decoder filter 205 instead of multiple decoder filters. In video player 200, the output pint of source filter 102 is always connected to the input pin of decoder filter 205. Decoder filter 205 handles dynamic changes by managing the connection between decoder filter 205 and video renderer filter 114 internally, thereby relieving application layer 206 from being involved in dynamic changes.

Applicant notes that a dynamic change does not concern the actual data decoding process of the decoder cores in decoder filter 205. Instead, a dynamic change involves the preparation in connecting the pins before the actual decoding of the video data. After a dynamic change, the decoder core switching may occur depending on the type of data waiting to be decoded.

Figure 3:
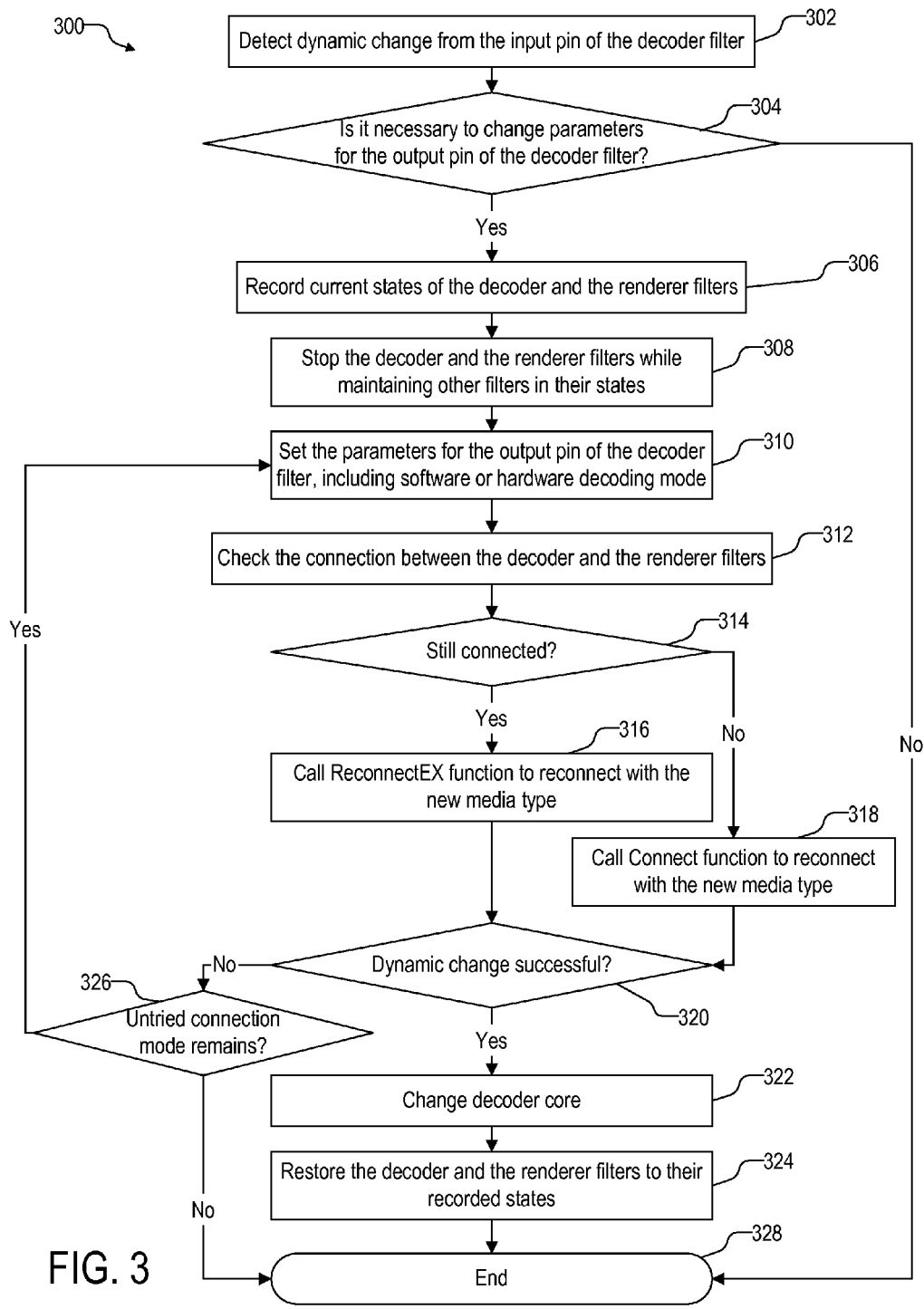
FIG. 3 is a flowchart for the video player of FIG. 2 in one embodiment of the invention.

FIG. 3 is a flowchart of a method 300 for decoder filter 205 to support a dynamic change in on embodiment of the invention.

In step 302, decoder filter 205 learns from its input pin of a dynamic change using a standard DirectShow function. For example, source filter 102 calls IMemInputPin::Receive (IMediaSample*pSample) function of the input pin of decoder filter 205 to stream the video data to decoder filter 205. In the Receive function, pSample is a pointer to a media sample that defines the media type. Decoder filter 205 detects a dynamic change when the media type in the media sample changes and then takes the appropriate actions. Step 302 is followed by step 304.

In step 304, decoder filter 205 determines if it has to change the parameters of its output pin depending on the dynamic change. If so, step 304 is followed by step 306. If it is not necessary to change the parameters of the output pin of decoder filter 205, step 304 is followed by step 328 and method 300 ends. Decoder filter 205 does not need to change the parameters of the output pin when there is a dynamic change of the first type of the display size or the aspect ratio where the video format and the decoding mode do not change. Decoder filter 205 has to change the parameters of the output pin when there is a dynamic change of the second and third types.

In step 306, decoder filter 205 records the current states of itself and renderer filter 114. To determine the current states of the filters, decoder filter 205 calls the IMediafilter:GetState function of each filter. Step 306 is followed by step 308.

In step 308, decoder filter 205 stops itself and renderer filter 114 while other filters remain in their current states. To stop itself and renderer filter 114, decoder filter 205 calls the IMediaFilter::Stop (void) functions of itself and renderer filter 114. Step 310 is followed by step 310.

In step 310, decoder filter 205 sets the parameters for the media type for its output pin in response to the dynamic change. The three main parameters are (1) the use of the software and the hardware decoding modes, (2) the aspect ratio (e.g., 4:3, 16:9, or other), and (3) the use or nonuse of de-interlace. Decoder filter 205 saves the parameters in an AM_MEDIA_TYPE data structure. Step 310 is followed by step 312.

In step 312, decoder filter 205 checks if its output pin remains connected to the input pin of renderer filter 114. Decoder filter 205 uses the CBasePin::IsConnected (void) function to check if its output pin remains connected to the input pin of renderer filter 114. Step 312 is followed by step 314.

Note that in most first passes through step 312 in method 300, the output pin of decoder filter 205 is connected to the input pin of renderer filter 114. However, through subsequent passes through step 312 in method 300, the output pin of decoder filter 205 may become disconnected from the input pin of renderer filter 114 due to changes to the media type for the dynamic change.

Step 314 is followed by step 316 if decoder filter 205 determines that the return value of the IsConnected function indicates that its output pin is remains connected to the input pin of renderer filter 114. Step 314 is followed by step 318 if decoder filter 205 determines the return value of the IsConnected function indicates its output pin is not connected to the input pin of renderer filter 114.

In step 316, decoder filter 205 calls the IFilterGraph2::ReconnectEx (IPin*ppin, const AM_MEDIA_TYPE*pmt) function of its output pin to break the connection at its output pin and then reconnect its output pin to the input pin of renderer filter 114 using the new media type specified for the dynamic change in the AM_MEDIA_TYPE data structure. In the ReconnectEx function, pmt is a pointer to the AM_MEDIA_TYPE data structure set by decoder filter 205 in step 310. In response, renderer filter 114 determines if the new media type is compatible with display card 116. Step 316 is followed by step 320.

In step 318, decoder filter 205 calls the IPin::Connect (IPIN*pReceivePin, const AM_MEDIA_TYPE*pmt) function of its output pin to reconnect its output pin to the input pin of renderer filter 114 using the new media type specified for the dynamic change. In the Connect function, pmt is a pointer to the AM_MEDIA_TYPE data structure set by decoder filter 205 in step 310. In response, renderer filter 114 determines if the new media type is compatible with display card 116. Step 318 is followed by step 320.

In step 320, decoder filter 205 determines if the dynamic change is successful. If so, then step 320 is followed by step 322. If the dynamic change is not successful, step 322 is followed by step 326.

When using the ReconnectEx function, the dynamic change is successful when (1) decoder filter 205 receives a positive return value (e.g., S_OK) for the ReconnectEx function, and (2) then decoder filter 205 calls the CBasePin::IsConnected (void) function of its output pin and receives a positive return value (e.g., TRUE) for the IsConnected function. When using the Connect function, the dynamic change is successful when decoder filter 205 receives a positive return value (e.g., S_OK) for the Connect function from renderer filter 114.

Failure in the dynamic change detected in step 320 may come from the hardware decoding mode when display card 116 does not support the dynamic change. Thus, decoder filter 205 may change from the hardware decoding mode to one of multiple software decoding modes in an attempt to play the video. Each software decoding mode displays the video data in a different color space (e.g., YUY2, YV12, REG32, RG24, and others) and ideally display card 116 supports at least one of the software decoding modes. Failure in the dynamic change may also come from the software decoding mode, e.g., when an older display card 116 does not support a large video resolution or another display capability.

In step 322, decoder filter 205 changes from one decoder core to another decoder core that is appropriate for the media type in the dynamic change. Step 322 is followed by step 324.

In step 324, decoder filter 205 restores itself and renderer filter 114 to their recorded states. Decoder filter 205 uses the IMediaFilter::Pause, IMediaFilter::Run, or IMediaFilter::Stop function to return the filters back to their recorded states. Step 324 is followed by step 328, which ends method 300.

In step 326, decoder filter 205 determines is there are untried connection modes. Specifically, decoder filter 205 checks if it has tried all the software decoding modes. If so, then step 326 is followed by step 310 and method 300 repeats until dynamic change is successful or all the connection modes have been tried. If all the connection modes have been tried, then step 326 is followed by step 328 to end method 300 because the dynamic change has failed.

Various other adaptations and combinations of features of the embodiments disclosed are within the scope of the invention. Numerous embodiments are encompassed by the following claims.

What is claimed is:

1. A method for a decoder filter to accommodate a dynamic change in a software video player comprising a filter graph including a source filter, the decoder filter, and a renderer filter, the decoder filter comprising a single output pin coupled to an input pin of the renderer filter, the decoder filter comprising a plurality of internal decoder cores, the method comprising:
   (1) learning from the input pin of the decoder filter of the dynamic change;
   (2) recording states of the decoder filter and the renderer filter;
   (3) stopping the decoder filter and the renderer filter without changing a state of the source filter;
   (4) setting parameters for the output pin of the decoder filter, the parameters including a decoding mode selected from the group consisting of one of a plurality of software decoding modes and a hardware decoding mode;
   (5) determining if the output pin of the decoder filter remains connected to the input pin of the renderer filter;
   (6) when the output pin of the decoder filter remains connected to the input pin of the renderer filter, calling a ReconnectEX function of the output pin of the decoder filter to change a new media type at the output pin of the decoder filter;
   (7) when the output pin of the decoder filter is not connected to the input pin of the renderer filter, calling a Connect function of the output pin of the decoder filter to connect the output pin of the decoder filter to the input pin of the renderer filter and to specify the new media type at the output pin of the decoder filter;
   (8) determining if the dynamic change is successful, wherein the dynamic change is successful when the ReconnectEX or the Connect function is successful;
   (9) when the dynamic change is successful:
      changing to an appropriate internal decoder core from the plurality of internal decoder cores in the decoder filter according to the new media type; and
      restoring the decoder filter and the renderer filter back to their recorded states;
   (10) when the dynamic change is unsuccessful, determining if there is an untried software decoding mode;
   (11) when there is an untried software decoding mode, setting the parameters for the output pin of the decoder filter to those of the untried software decoding mode and repeating steps (5) to (11) for the untried software decoding mode.

2. The method of claim 1, wherein the plurality of internal decoder cores include a MPEG2 decoder core 208, a H.264 decoder core 210, and a Video Codec 1 decoder core 212.

3. The method of claim 2, wherein each internal decoder core is implemented as a Windows dynamic linked library (DLL) module.

4. The method of claim 1, wherein the dynamic change includes at least one of:
   a dynamic change of an input video format for the software video player; and
   a dynamic change between the decoding modes when the video format does not change.

5. The method of claim 1, wherein said setting parameters comprises saving the parameters in an AM_MEDIA_TYPE data structure for the output pin of the decoder filter.

6. The method of claim 1, wherein:
   the dynamic change is successful for said calling a ReconnectEx function if (1) a successful return value is received for said calling a ReconnectEx function and (2) a successful return value is received for calling a IsConnected function of the output pin of the decoder filter; and
   the dynamic change is successful for said calling a Connect function if a successful return value is received for said calling a Connect function.

7. The method of claim 1, wherein each software decoding mode displays video in a different color space.

8. The method of claim 1, wherein the decoder filter comprises a single input pin that remains connected to an output pin of the source filter during steps (1) to (11).

9. A non-transitory computer-readable storage medium encoded with executable instructions for execution by a processor implementing a decoder filter to accommodate a dynamic change in a software video player comprising a filter graph including a source filter, the decoder filter, and a renderer filter, the decoder filter comprising a single output pin coupled to an input pin of the renderer filter, the decoder filter comprising a plurality of internal decoder cores, the instructions comprising:
   (1) learning from the input pin of the decoder filter of the dynamic change;
   (2) recording states of the decoder filter and the renderer filter;
   (3) stopping the decoder filter and the renderer filter without changing a state of the source filter;
   (4) setting parameters for the output pin of the decoder filter, the parameters including a decoding mode selected from the group consisting of one of a plurality of software decoding modes and a hardware decoding mode;
   (5) determining if the output pin of the decoder filter remains connected to the input pin of the renderer filter;
   (6) when the output pin of the decoder filter remains connected to the input pin of the renderer filter, calling a ReconnectEX function of the output pin of the decoder filter to change a new media type at the output pin of the decoder filter;
   (7) when the output pin of the decoder filter is not connected to the input pin of the renderer filter, calling a Connect function of the output pin of the decoder filter to connect the output pin of the decoder filter to the input pin of the renderer filter and to specify the new media type at the output pin of the decoder filter;
   (8) determining if the dynamic change is successful, wherein the dynamic change is successful when the ReconnectEX or the Connect function is successful;
   (9) when the dynamic change is successful:
      changing to an appropriate internal decoder core from the plurality of internal decoder cores in the decoder filter according to the new media type; and
      restoring the decoder filter and the renderer filter back to their recorded states;
   (10) when the dynamic change is unsuccessful, determining if there is an untried software decoding mode;
   (11) when there is an untried software decoding mode, setting the parameters for the output pin of the decoder filter to those of the untried software decoding mode and repeating steps (5) to (11) for the untried software decoding mode.

10. The non-transitory computer-readable storage medium of claim 9, wherein the plurality of internal decoder cores include a MPEG2 decoder core 208, a H.264 decoder core 210, and a Video Codec 1 decoder core 212.

11. The non-transitory computer-readable storage medium of claim 10, wherein each internal decoder core is implemented as a Windows dynamic linked library (DLL) module.

12. The non-transitory computer-readable storage medium of claim 9, wherein the dynamic change includes at least one of:
   a dynamic change of an input video format for the software video player; and
   a dynamic change between the decoding modes when the video format does not change.

13. The non-transitory computer-readable storage medium of claim 9, wherein said setting parameters comprises saving the parameters in an AM_MEDIA_TYPE data structure for the output pin of the decoder filter.

14. The non-transitory computer-readable storage medium of claim 9, wherein:
   the dynamic change is successful for said calling a ReconnectEx function if (1) a successful return value is received for said calling a ReconnectEx function and (2) a successful return value is received for calling a IsConnected function of the output pin of the decoder filter; and
   the dynamic change is successful for said calling a Connect function if a successful return value is received for said calling a Connect function.

15. The non-transitory computer-readable storage medium of claim 9, wherein each software decoding mode displays video in a different color space.

16. The non-transitory computer-readable storage medium of claim 9, wherein the decoder filter comprises a single input pin that remains connected to an output pin of the source filter during steps (1) to (11).

* * * * *